United States Patent
Wolf et al.

(10) Patent No.: US 10,979,824 B2
(45) Date of Patent: Apr. 13, 2021

(54) TRANSDUCER ASSEMBLIES AND METHODS

(71) Applicant: KNOWLES ELECTRONICS, LLC, Itasca, IL (US)

(72) Inventors: Christopher Konrad Wolf, San Jose, CA (US); Niel D. Warren, Itasca, IL (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 16/343,835

(22) PCT Filed: Oct. 25, 2017

(86) PCT No.: PCT/US2017/058302
§ 371 (c)(1),
(2) Date: Apr. 22, 2019

(87) PCT Pub. No.: WO2018/081278
PCT Pub. Date: May 3, 2018

(65) Prior Publication Data
US 2019/0253810 A1 Aug. 15, 2019

Related U.S. Application Data

(60) Provisional application No. 62/414,578, filed on Oct. 28, 2016.

(51) Int. Cl.
*H04R 3/00* (2006.01)
*H04R 19/04* (2006.01)
(Continued)

(52) U.S. Cl.
CPC ............. *H04R 19/04* (2013.01); *G06F 13/42* (2013.01); *G06F 13/4282* (2013.01);
(Continued)

(58) Field of Classification Search
CPC .......... H04R 19/04; H04R 1/222; H04R 3/06; G06F 13/42; G06F 13/4282; Y02D 10/14; Y02D 10/151; Y02D 10/00
(Continued)

(56) References Cited

U.S. PATENT DOCUMENTS

| 5,822,598 A | 10/1998 | Lam |
| 6,070,140 A | 5/2000 | Tran |

(Continued)

FOREIGN PATENT DOCUMENTS

| WO | WO-2016/179392 A1 | 11/2016 |
| WO | WO-2019/133645 A1 | 7/2019 |
| WO | WO-2020/076846 A1 | 4/2020 |

OTHER PUBLICATIONS

International Search Report and Written Opinion, PCT/US2017/058302 (dated Dec. 28, 2017).

*Primary Examiner* — Ammar T Hamid
(74) *Attorney, Agent, or Firm* — Foley & Lardner LLP (57) ABSTRACT

A method in a transducer assembly having an external-device interface coupled to a communication protocol interface of the transducer assembly. The transducer assembly is configured to convert an input signal having one physical form to an output signal having a different physical form. At least two electrical signals are received on corresponding contacts of the external-device interface of the transducer assembly. A characteristic of at least one of the electrical signals is determined by evaluating a logic transition of the signal. A unique identity assigned to the transducer assembly is determined based on the characteristic.

21 Claims, 9 Drawing Sheets

(51) Int. Cl.
*G06F 13/42* (2006.01)
*H04R 1/22* (2006.01)
*H04R 3/06* (2006.01)

(52) U.S. Cl.
CPC .............. *H04R 1/222* (2013.01); *H04R 3/06* (2013.01); *Y02D 10/00* (2018.01)

(58) Field of Classification Search
USPC ............................................ 381/111, 113, 11
See application file for complete search history.

(56) References Cited

U.S. PATENT DOCUMENTS

| | | |
|---|---|---|
| 6,154,721 A | 11/2000 | Sonnic |
| 6,249,757 B1 | 6/2001 | Cason |
| 6,397,186 B1 | 5/2002 | Bush et al. |
| 6,756,700 B2 | 6/2004 | Zeng |
| 7,190,038 B2 | 3/2007 | Dehe et al. |
| 7,415,416 B2 | 8/2008 | Rees |
| 7,473,572 B2 | 1/2009 | Dehe et al. |
| 7,774,204 B2 | 8/2010 | Mozer et al. |
| 7,781,249 B2 | 8/2010 | Laming et al. |
| 7,795,695 B2 | 9/2010 | Weigold et al. |
| 7,825,484 B2 | 11/2010 | Martin et al. |
| 7,829,961 B2 | 11/2010 | Hsiao |
| 7,856,804 B2 | 12/2010 | Laming et al. |
| 7,903,831 B2 | 3/2011 | Song |
| 7,957,972 B2 | 6/2011 | Huang et al. |
| 8,275,148 B2 | 9/2012 | Li et al. |
| 8,666,751 B2 | 3/2014 | Murthi et al. |
| 8,687,823 B2 | 4/2014 | Loeppert et al. |
| 8,972,252 B2 | 3/2015 | Hung et al. |
| 8,996,381 B2 | 3/2015 | Mozer et al. |
| 9,043,211 B2 | 5/2015 | Haiut et al. |
| 9,112,984 B2 | 8/2015 | Sejnoha et al. |
| 9,866,938 B2 | 1/2018 | Popper et al. |
| 10,165,359 B2 | 12/2018 | Pawlowski et al. |
| 10,721,557 B2 | 7/2020 | Pawlowski et al. |
| 2005/0207605 A1 | 9/2005 | Dehe et al. |
| 2006/0074658 A1 | 4/2006 | Chadha |
| 2007/0278501 A1 | 12/2007 | MacPherson et al. |
| 2008/0175425 A1 | 7/2008 | Roberts et al. |
| 2008/0267431 A1 | 10/2008 | Leidl et al. |
| 2008/0279407 A1 | 11/2008 | Pahl |
| 2008/0283942 A1 | 11/2008 | Huang et al. |
| 2009/0001553 A1 | 1/2009 | Pahl et al. |
| 2009/0180655 A1 | 7/2009 | Tien et al. |
| 2010/0046780 A1 | 2/2010 | Song |
| 2010/0052082 A1 | 3/2010 | Lee et al. |
| 2010/0128914 A1 | 5/2010 | Khenkin |
| 2010/0183181 A1 | 7/2010 | Wang |
| 2010/0246877 A1 | 9/2010 | Wang et al. |
| 2010/0290644 A1 | 11/2010 | Wu et al. |
| 2010/0322443 A1 | 12/2010 | Wu et al. |
| 2010/0322451 A1 | 12/2010 | Wu et al. |
| 2011/0013787 A1 | 1/2011 | Chang |
| 2011/0075875 A1 | 3/2011 | Wu et al. |
| 2012/0232896 A1 | 9/2012 | Taleb et al. |
| 2012/0310641 A1 | 12/2012 | Niemisto et al. |
| 2013/0044887 A1 | 2/2013 | Dong et al. |
| 2013/0058495 A1 | 3/2013 | Furst et al. |
| 2013/0223635 A1 | 8/2013 | Singer et al. |
| 2014/0163978 A1 | 6/2014 | Basye et al. |
| 2014/0244269 A1 | 8/2014 | Tokutake |
| 2014/0254837 A1* | 9/2014 | Mortensen ................ H03F 3/68 381/120 |
| 2014/0257821 A1 | 9/2014 | Adams et al. |
| 2014/0274203 A1 | 9/2014 | Ganong et al. |
| 2014/0278435 A1 | 9/2014 | Ganong et al. |
| 2014/0281628 A1 | 9/2014 | Nigam et al. |
| 2014/0343949 A1 | 11/2014 | Huang et al. |
| 2015/0106085 A1 | 4/2015 | Lindahl |
| 2015/0112690 A1 | 4/2015 | Guha et al. |
| 2015/0134331 A1 | 5/2015 | Millet et al. |
| 2015/0220475 A1 | 8/2015 | Amarilio et al. |
| 2015/0362362 A1 | 12/2015 | Pan et al. |
| 2016/0012007 A1 | 1/2016 | Popper et al. |
| 2016/0192084 A1 | 6/2016 | Oliaei |
| 2020/0329325 A1 | 10/2020 | Thukral et al. |

* cited by examiner

| PAD pin number | | | | | | | Unique ID |
|---|---|---|---|---|---|---|---|
| 0 | 1 | 2 | 3 | 4 | 5 | 6 | |
| GND | VDD | CLOCK | DATA | Not Used | | | 0 |
| | | DATA | CLOCK | | | | 1 |

| Package pin number | | | | Unique ID | Function |
|---|---|---|---|---|---|
| P.7 | P.3 | P.1 | P.2 | P.4 | |
| GND | VDD | CLOCK | DATA | SELECT 0 | SoundWire microphone |
| | | DATA | CLOCK | SELECT 1 | |
| | | CLOCK | SELECT 0 | SELECT 0 | |
| | | DATA | SELECT 1 | SELECT 1 | |
| | | SELECT 0 | CLOCK | DATA | |
| | | SELECT 1 | DATA | CLOCK | |
| | | SELECT 0 | DATA | CLOCK | Reserved(*) — 6 |
| | | SELECT 1 | CLOCK | DATA | Reserved(*) — 7 |
| | | | | | PDM, new data when CLOCK=0 |
| | | | | | PDM, new data when CLOCK=1 |

500b — 503b, 505b, 501b, 507b, 510b

| PAD pin number | | | | | | | Unique ID |
|---|---|---|---|---|---|---|---|
| ❼ | ❸ | ❶ | ❷ | ❹ | ❺ | ❻ | |
| GND | VDD | CLOCK | DATA | SENSE 0/7 | Not Used | | 0 |
| | | | | 1/7 | | | 1 |
| | | | | 2/7 | | | 2 |
| | | | | 3/7 | | | 3 |
| | | | | 4/7 | | | 4 |
| | | | | 5/7 | | | 5 |
| | | | | 6/7 | | | 6 |
| | | | | 7/7 | | | 7 |
| | | DATA | CLOCK | 0/7 | | | 8 |
| | | | | 1/7 | | | 9 |
| | | | | 2/7 | | | 10 |
| | | | | 3/7 | | | 11 |
| | | | | 4/7 | | | 12 |
| | | | | 5/7 | | | 13 |
| | | | | 6/7 | | | 14 |
| | | | | 7/7 | | | 15 |

TRANSDUCER ASSEMBLIES AND METHODS

CROSS-REFERENCE TO RELATED APPLICATIONS

This application is a National Stage Application of PCT/US2017/058302, filed Oct. 25, 2017, which claims the benefit of and priority to U.S. Provisional Patent Application No. 62/414,578, filed Oct. 28, 2016, the entire contents of which are incorporated herein by reference.

FIELD OF THE DISCLOSURE

The present disclosure relates generally to transducer assemblies having a digital communication interface and more particularly to configuration of a communication protocol of the interface, and methods therefor.

BACKGROUND

Electroacoustic transducers, like speakers and microphones, having digital interfaces are known generally and provide a better signal-to-noise ratio and RF immunity than devices with analog interfaces. For example, digital microphones are used in numerous applications, such as portable communication devices including smartphones etc., where improved noise immunity provides a better user experience. The digital interface of these and other transducers is generally compliant with a single standardized communication protocol so that the transducer can exchange data and control information when connected to a host device.

The various aspects, features and advantages of the present disclosure will become more fully apparent to those having ordinary skill in the art upon consideration of the following Detailed Description and the accompanying drawings described below.

BRIEF DESCRIPTION OF THE DRAWINGS

The disclosure is described in more detail below in connection with the appended drawings in which.

DETAILED DESCRIPTION

In the following, various exemplary embodiments are described with reference to the appended drawings. The skilled person will understand that the accompanying drawings are schematic and simplified for clarity and therefore merely show details which are essential to the understanding of the disclosure, while other details have been left out. Like reference numerals generally refer to like elements or components throughout. Like elements or components will therefore not necessarily be described in detail with respect to each figure. It will be appreciated further that certain actions or steps may be described or depicted in a particular order of occurrence while those skilled in the art will understand that such specificity with respect to sequence is not actually required unless so indicated.

The transducer assemblies or devices described herein may form part of a portable communication device or apparatus such as a smartphone, mobile phone, laptop computer, gaming device, inventory device, point of sale device, etc. Alternatively, the transducer assemblies may be used in a relatively stationary application, like in a gaming console, a desktop microphone, or in an appliance, among other applications. The transducer assemblies may also be used in vehicles and in other devices or systems. In some implementations, two or more nominally identical transducer assemblies are employed in the same device. Microphones are considered nominally identical if they communicate using the same protocol. For example, multiple digital microphones may be integrated in a portable electronic device like a smart phone for sensing various sounds such as speech and background noise for subsequent processing. In other embodiments, the transducer assemblies are embodied as other sensors, like pressure, temperature, gas, and ultrasonic sensors. A transducer assembly may also comprise a combination of sensors, for example, an acoustic sensor and a pressure sensor, or an acoustic sensor in combination with another sensor like a temperature sensor and a gas sensor, among other sensors.

Figure 1:
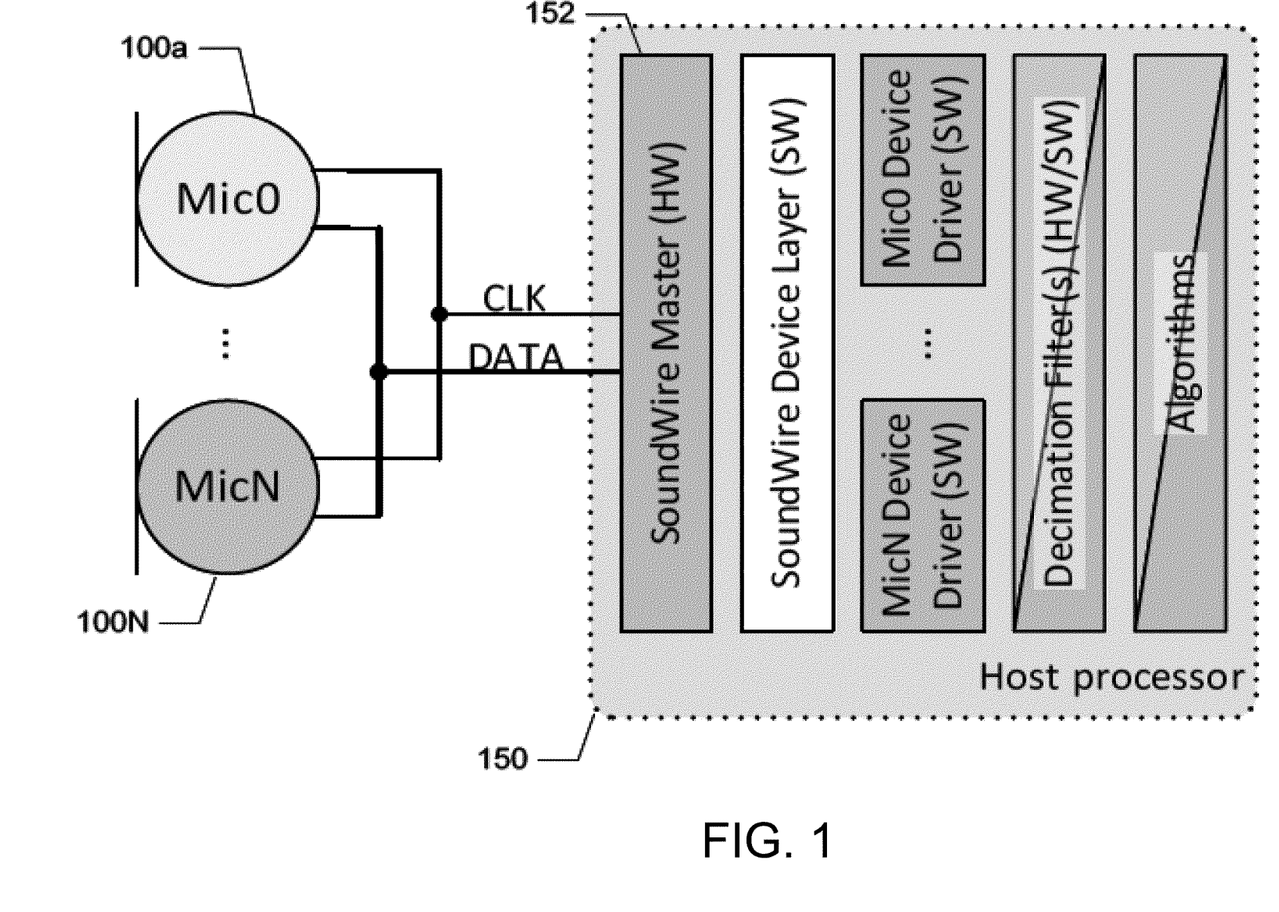
FIG. 1 is a schematic block diagram of a communication device comprising a plurality of nominally identical digital microphone assemblies connected to a host processor via a host communication interface.

In one embodiment, one or more transducer assemblies are electrically coupled to an external processor. FIG. 1 is a schematic block diagram of a host processor 150 electrically coupled to a plurality of microphone assemblies, 100a, 100N. The host processor may be part of a portable electronic device or some other system or device, examples of which are discussed herein. As suggested, each microphone assembly comprises a plurality of externally accessible contacts that are electrically coupled to corresponding contacts of the host hardware interface. The term "contact" is used generically herein to mean pins, pads, through-holes, sockets, etc. and any other conductive member that may be electrically coupled to a mating structure irrespective of the shape or configuration of the contact or the mechanism (e.g., soldering, friction fit, etc.) by which the electrical and mechanical coupling is achieved.

The one or more transducer assemblies may be electrically coupled to the host processor, device or system by a carrier substrate to which the host processor is mounted or otherwise electrically connected. The carrier substrate may be implemented as a circuit board, socket or other interface. The carrier substrate generally includes wires or traces interconnecting a plurality of external contacts on an interface of the carrier substrate to corresponding busses of the host device or communication interface. The host processor, device or system could be coupled to contacts (e.g., a socket) on another interface of the carrier substrate. In embodiments where the carrier substrate is a circuit board, the wires or traces are integrally formed on or within the circuit board. In other embodiments however the wires or traces are not necessarily integrally formed on or with the carrier substrate. As suggested, the external contacts on the interface of the carrier substrate may be embodied as through-holes, pads, pins, sockets, etc. electrically connectable to corresponding contacts of the one or more transducer assemblies. Such an electrical connection may be realized using reflow, wave or manual soldering processes among other coupling means.

Generally, the one or more transducer assemblies coupled to the carrier substrate communicate with the host processor, device or system via a proprietary or standard communication protocol. Standard protocols include, for example, $I^2C$, $I^2S$, USB, UART and SPI among other known and future protocols. In FIG. 1, the microphone assemblies include a communication interface (e.g., contacts) that is electrically coupled to a shared buss of a Soundwire protocol hardware interface 152 associated with the host processor. The interface contacts between the host processor and the microphone assemblies are illustrated only schematically in FIG. 1. More generally however, the host communication interface could be compliant with some other communication protocol. The particular protocol may depend, in part, on the type of transducer assembly among other considerations. The number of nominally identical transducer assemblies connected to the shared data bus of the host communication interface may vary depending on the requirements of a particular application and the protocol implemented. For Soundwire protocol applications, up to 11 devices may concurrently share a common bus. Other proprietary or standard interface communication protocols may support more or less devices.

In FIG. 1, consistent with the Soundwire protocol, the plurality of externally accessible contacts of each microphone assembly comprise a first data interface contact (CLK) and a second data interface contact (DATA) connected to corresponding contacts of the host communication interface, wherein the multiple microphone assemblies 100a, 100N share buses, e.g., the CLK and DATA busses, of the host communication interface. More generally however the communication interface may have more or less contacts. For example, the contacts may correspond to one or more of Select, Clock (CLK), Data, Word Sync (WS), Enable (En) functions, among others depending on the application or protocol. Some communication interfaces may also include power (VDD) and ground (GND) contacts. In some embodiments, one or more of the contacts are configurable to perform these or other functions. The DATA bus may be unidirectional or bi-directional depending on the protocol of the host communication interface.

Figure 2:
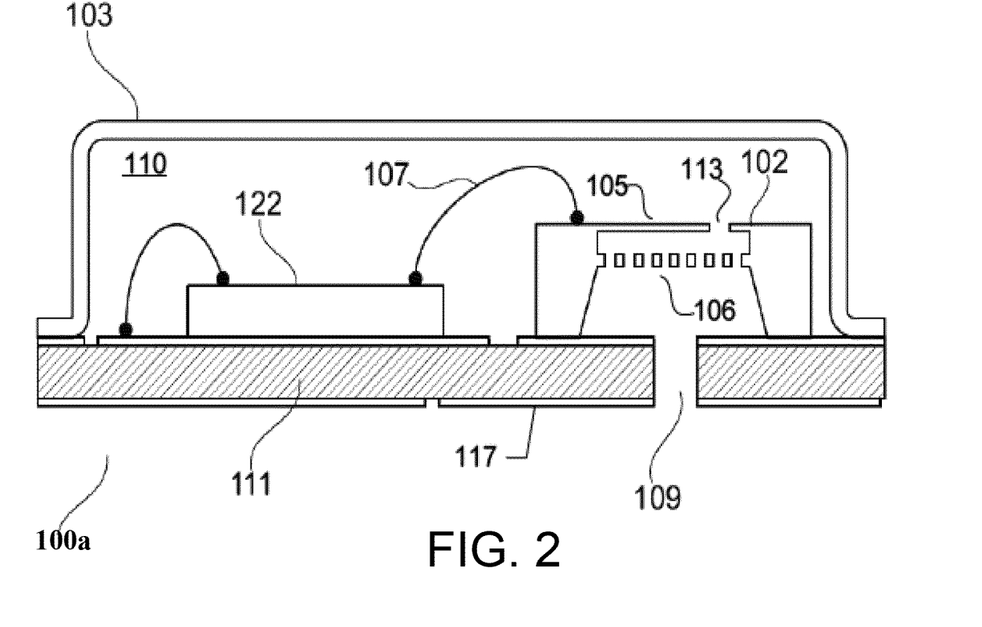
FIG. 2 is an internally exposed view of a digital microphone assembly.

FIG. 2 is an exemplary embodiment of a microphone assembly 100a representative of one of the digital microphone assemblies discussed above. The assembly comprises a capacitive transducer element 102, e.g., a microelectromechanical system (MEMS) transducer, or some other type of transducer, for example, a piezo-electric transducer. In microphone applications, the capacitive transducer element converts incoming acoustic energy into an electrical signal. In FIG. 2, the transducer element 102 comprises first and second transducer plates embodied as a diaphragm 105 and a back plate 106. A charge or bias is applied to the diaphragm and back plate by a DC charging circuit (not shown but well known). The microphone assembly also comprises a processing circuit 122 which may include a semiconductor die, for example a mixed-signal CMOS semiconductor device integrating analog and digital circuits. In some embodiments, the transducer assembly includes an identification code generator discussed further below. The processing circuit 122 is shaped and sized for mounting on a substrate or carrier element 111 of the assembly. The carrier element also supports the transducer element 102. The microphone assembly comprises a lid 103 mounted on the substrate such that the lid and substrate jointly form an interior volume or cavity within a housing enclosing and protecting the transducer element 102 and the processing circuit 122. The housing comprises a sound inlet or port 109 through the carrier element 111, or through the lid in other embodiments, for conveying acoustic energy to the transducer element 102 as is known generally. The transducer element generates an electrical signal at its output in response to sensed acoustic energy. The transducer element 102 may include an output pad or terminal that is electrically coupled to the processing circuit 122 via one or more interconnecting wires 107. For surface mount devices, an essentially plane outwardly oriented lower surface 117 of the carrier element 111 comprises a plurality of external contacts discussed above, an example of which is illustrated in FIG. 3.

The acoustic sensor of FIG. 2 is but one example of a transducer assembly. In other implementations of the disclosure, the transducer assembly could be embodied as a pressure sensor, a temperature sensor, a gas sensor, and an ultrasonic sensor, among other sensors that include an interface for communicating with a host or external device using a standard or proprietary protocol. The acoustic sensor could also be embodied as a combination of one or more of the foregoing sensors, for example, an acoustic sensor having integrated therewith one or more of a temperature sensor, a pressure sensor, a gas sensor, etc.

Figure 3:
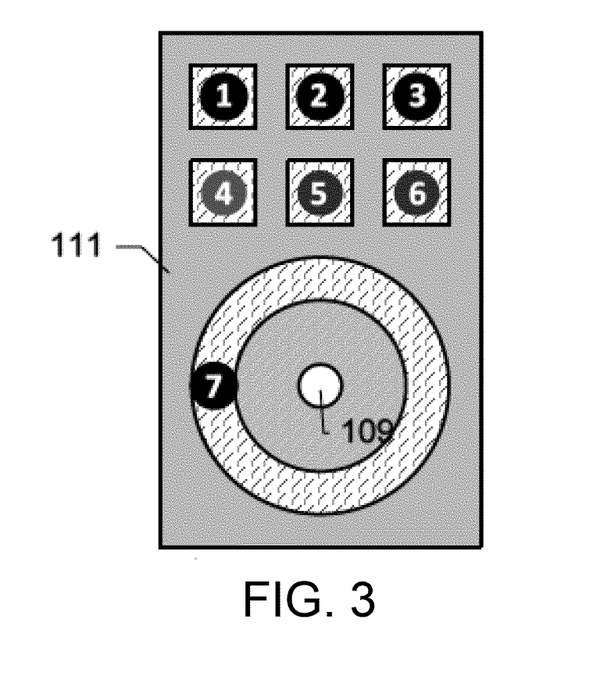
FIG. 3 is a digital interface for a surface mount transducer assembly comprising a plurality of externally accessible contacts.

FIG. 3 is a bottom view of an exemplary miniature transducer assembly having a digital interface comprising a plurality of externally accessible contacts numbered from 1 to 7. Other microphone or transducer assemblies however may comprise more or less contacts. Each of the contacts 1 to 7, designated below as P-1, P-2 . . . P-7, may for example comprise a solder pad or bump for reflow soldering the transducer assembly onto a carrier substrate of a host device. As noted, the carrier substrate may be embodied as a printed circuit board, which may also support a host processor and shared bus lines or wires (e.g., CLK and DATA among others depending on the protocol and the particular application) coupled to the host processor. In FIG. 3, the externally accessible contacts 1 to 6 are rectangular with substantially identical size and are spaced apart with a suitable pitch or separation. Contacts in other embodiments may have other shapes, arrangements and spacing. In FIG. 3, for example, the contact 7, designated P-7 below, is shaped as a circular solder-ring surrounding the sound port 109. In some implementations, contact 7 may be a ground connection of the assembly. More generally however the interface could be for any other sensor, examples of which are discussed herein, and the contact arrangement and configuration may be specific to the particular sensor or sensors, application, and implementation constraints.

Figure 4:
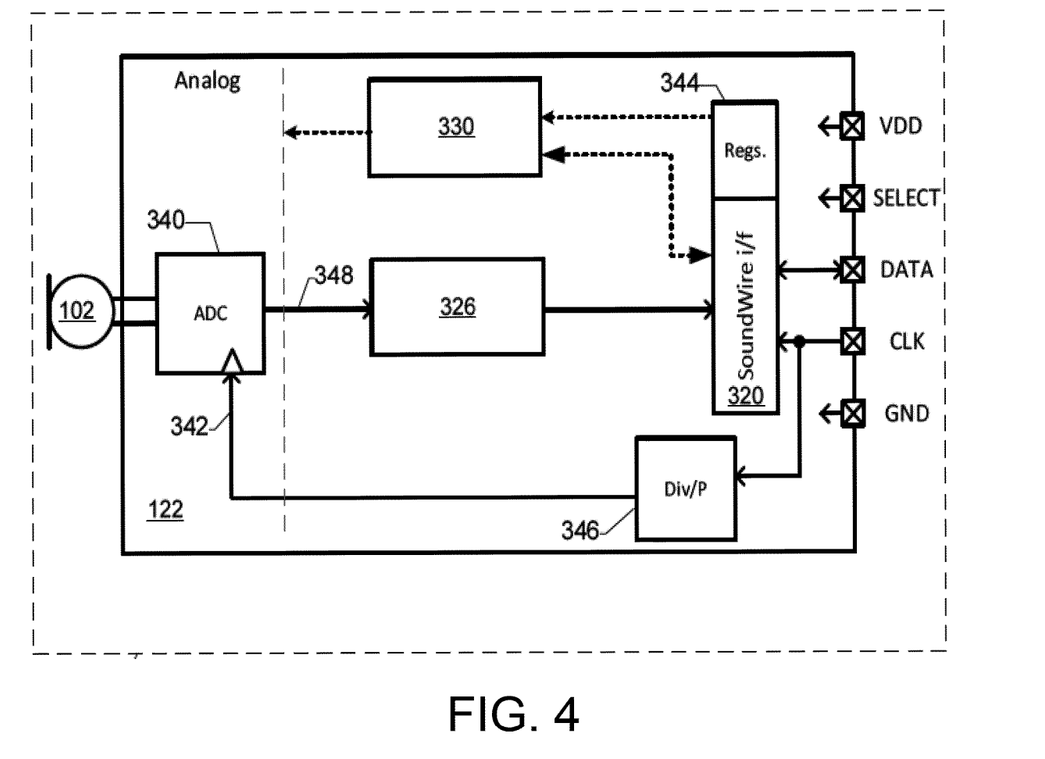
FIG. 4 is a schematic block diagram of a digital transducer assembly.

FIG. 4 is an electrical block diagram of a first exemplary embodiment of the processing circuit 122 of a transducer assembly, which may correspond to the microphone 100a in FIG. 2 or to some other transducer assembly. In FIG. 4, an analog electrical signal generated by the transducer element 102 in response to sensing an acoustic input is input to the processing circuit 122 via bonding wires and/or pads as discussed above. More generally, however, the transducer may sense ultrasonic energy, temperature, pressure, gas etc. and provide an appropriate electrical output to the processing circuit. The processing circuit may comprise a CMOS semiconductor die embodied in whole or in part as one or more ASICs or other circuits for performing the functions described herein. In FIG. 4, the sensor 102 is an acoustic sensor and the processing circuit 122 includes a Soundwire compliant communication protocol interface 320. Other protocols may also be used for acoustic sensors. More generally, in other implementations the sensor could be a non-acoustic device and the communication interface could be compliant with some other communication protocol, such as $I^2C$, $I^2S$, USB, UART, SPI, among other known or future protocols. In some embodiments, as suggested, the transducer type may limit the interfaces available. For example, the Soundwire interface is suitable for acoustic signal interfaces.

The Soundwire protocol interface includes a DATA contact and a CLK contact but the SELECT function is not used. Thus the SELECT contact is generally not required on transducer assemblies implementing the Soundwire protocol. In some embodiments, however, the SELECT contact is used for Soundwire protocol applications to provide a greater number of unique identities and to accommodate different communication protocols as discussed further herein. In FIG. 4, power is supplied to the processing circuit 122 via the VDD and GND contacts, for example, corresponding to contacts P-3 (VDD) and P-7 (GND) in FIG. 3. A communication interface configured for other protocols may associate other functions with other contacts on the user interface. The processing circuit 122 may also comprise voltage or current regulators (not shown) that regulate power to the circuit blocks of the processing circuit 122.

In FIG. 4, the processing circuit 122 also comprises a single-bit or multi-bit analog-to-digital (A/D) converter 340 coupled to an output of the transducer element 102, for example through a DC blocking capacitor, for receipt of the electrical signal produced by the transducer element 102. Some embodiments of the processing circuit 122 may comprise a preamplifier or an impedance matching circuit (not shown) in the signal path between the transducer element and the A/D converter 340 to amplify and/or buffer the electrical signal prior to the A/D converter. The optional preamplifier or impedance matching circuit may be embodied as discrete components or as components integrated with other components on a common ASIC. The A/D converter produces a digital signal or stream of samples representative of an analog electrical signal obtained from the transducer 102. The A/D converter may be implemented as a multi-level sigma-delta converter ($\Sigma\Delta$) or modulator or a flash converter. In one embodiment, the sigma-delta converter is clocked at a first oversampled frequency or sampling rate, for example a sampling frequency between 1.2 MHz and 3.072 MHz. In other embodiments, the A/D converter is clocked at other rates.

In FIG. 4, an optional programmable clock divider 346 is configured to produce an internal clock signal 342 from an external clock signal provided by the host device at the CLK contact of the external-device interface. The programmable clock divider 346 may for example be configured to divide the external clock signal by an integer number based on information in a system control register 344 associated with a processor or controller 330 of the processing circuit 122. The external processor (e.g., the host device processor 150 in FIG. 1) generally supports one or more standardized clock frequencies, such as 19.2 MHz and 6.144 MHz, which can be reduced to common digital audio sampling frequencies such as 48 kHz using an integer clock division scheme. Alternatively, the internal clock signal 342 could be generated from an internal oscillator of the transducer assembly. The internal clock signal, whether obtained from a local oscillator or from an external source or from a combination thereof, sets the sample rate or frequency of the A/D converter 340 and the clock frequency of various other circuits of the transducer assembly. In one implementation, the sample rate of the ADC 340 is set to 3.072 MHz or 2.4 MHz.

Generally, various device settings and configurations of the transducer assembly are controlled by the processor or controller 330 of the transducer assembly and any required settings may be stored in non-volatile memory of the transducer assembly, for example in the system registers 344 of FIG. 4. These device settings and configurations of the transducer assembly may be controlled by an external processor, such as a DSP or microprocessor of the host device, by writing appropriate commands to the controller 330 via one of the contacts of the external-device interface. Where the communication interface of the microphone assembly is SoundWire compliant as discussed above, the controller and associated registers may be used to customize certain SoundWire parameters such as a number of channels, sample width, sample interval, HStart, HStop (Number of frame columns–1) and the block offset of each microphone assembly connected to the SoundWire bus, e.g., 1, 4 and 7. The system registers may be used to store other types of useful device information such as a device identification number which is a unique identification for a particular microphone assembly on a bus shared by two or more other microphones assemblies. In some embodiments where multiple transducers are connected to a common bus, the transducer assembly communicates the device identification to a host processor via the interface coupled to a bus of the host communication interface. In other embodiments, the host processor is aware of the device identification number by virtue of the configuration of the contacts of the carrier substrate to which the host device is coupled.

Figure 5:
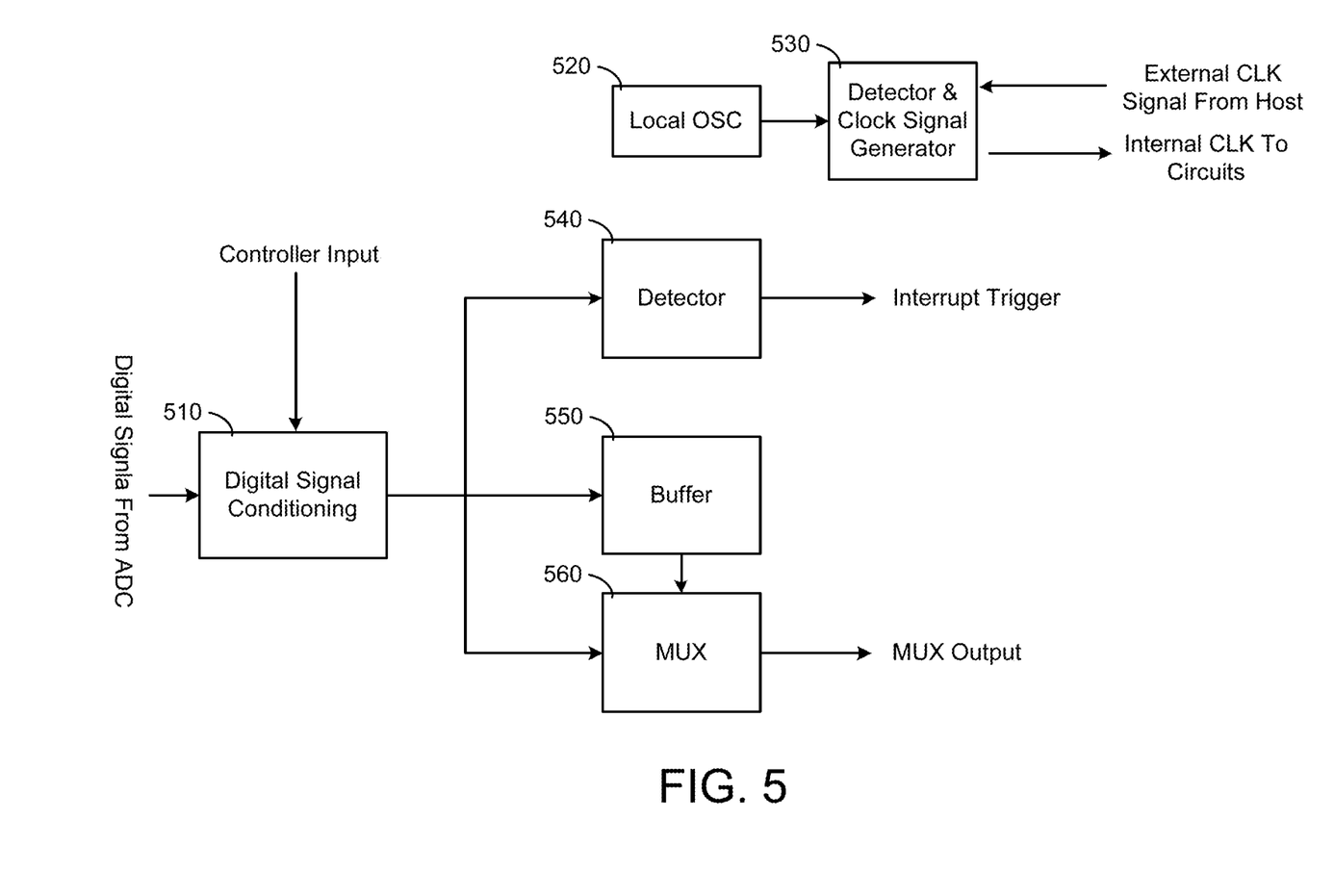
FIG. 5 is a schematic block diagram of optional circuits of the processing circuit for a digital transducer of FIG. 4 assembly.

In FIG. 4, the processing circuit 122 may also comprise additional optional circuits identified schematically at block 326, examples of which are illustrated in FIG. 5. The optional circuits include a digital signal conditioning circuit 510 having an input coupled to the A/D converter, for example, the ADC 340 of FIG. 4, wherein the conditioning circuit receives a stream of samples from the A/D converter. The signal conditioning circuit generally structures and times received bits according to a communication interface configuration set or defined by a controller, for example, the controller 330 in FIG. 4. In one embodiment, in FIG. 5, the circuit 510 includes a digital-to-digital (D/D) converter configured to generate a corresponding Pulse Density Modulated (PDM) signal. In embodiments where the transducer assembly outputs PDM format signals, a PDM signal is applied to an input of the communication interface 320 in FIG. 4. In Soundwire protocol implementations, the communication interface is configured to write each bit of the PDM signal to a particular frame column of a predetermined frame row of a Soundwire data frame. The Soundwire compliant communication interface writes the bits of the PDM signal to the externally accessible DATA contact for input to the Soundwire data bus of the host communication interface. In some transducer assembly implementations, it is not desirable to convert the digital signal to PDM format and thus the D/D converter is not required.

In FIG. 5, in some embodiments, the processing circuit of the transducer assembly includes a local oscillator 520 coupled to a clock signal generator 530 that produces an internal clock signal during at least some time periods. For example, the internal clock signal generated from the local oscillator may be used when operating in a low power, always-on mode when the host device or system is in a sleep mode or when an external clock signal is otherwise not available from the external processor. The clock signal generator 530 may also perform clock signal division in lieu of the clock divider 346 in FIG. 4. The functionality of the clock signal generator may be implemented in whole or part by discrete circuits or components or by a processor, for example the processor 330 of FIG. 4.

In FIG. 5, in some embodiments, the processing circuit of the transducer assembly also includes a detector 540 that detects one or more voice characteristics or speech of the sensor signal. Such characteristics or speech include the presence of voice activity, or more sophisticated characteristics like phonemes, keywords, commands, or phrases. In embodiments where the microphone assembly operates in an always-on mode, voice activity detection may occur at low power while the host device is asleep. Voice activity detection is characterized generally as voice versus noise discrimination. The detection of more sophisticated voice characteristics like speech generally occurs only upon prior detection of likely voice activity. This approach reduces power consumption since the speech detector can sleep until likely voice activity is detected. The more sophisticated characteristics like speech generally do not exist in the absence of voice activity and the processing of these characteristics requires more processing resources and power consumption. The detection of these more sophisticated voice characteristics may be performed at the microphone assembly or at the host device. Thus upon successful detection of voice activity, the microphone assembly may awaken circuits in the microphone assembly or in the host to perform such function. In some embodiments, the detector 540 may attempt to detect one of the more sophisticated voice characteristics without performing prior voice activity detection, for example, where voice activity detection is not implemented or in embodiments where increased power consumption associated with the detection of more sophisticated voice characteristics is not a concern. Where detection of voice activity or other voice characteristics occurs at the microphone assembly, data is buffered in buffer 550 during detection to ensure that potentially valid voice data is not lost during detection.

In some embodiments, the digital signal is subject to a format change before buffering and in some embodiments before voice activity detection. For example, a PDM format signal output from the signal conditioner may be converted to a PCM format signal using a decimator before buffering. Voice activity detection may be performed on PDM or PCM format data or on some other format data. Thus in some embodiments it may not be necessary to decimate the digital signal on which detection occurs.

In one implementation, the host device is in a sleep or partial sleep mode during voice activity detection by the microphone assembly. The microphone assembly may awaken the host device with an interrupt signal provided by the microphone assembly upon detection of likely voice or upon subsequent detection of a phoneme, keyword, command, or phrase at the microphone assembly if detection of these other voice characteristics is performed at the microphone assembly. In always-on applications, the microphone assembly reverts to the low power voice activity detection mode absent detection of the more sophisticated voice characteristics without interrupting the host device. If detection of the more sophisticated voice characteristics like phonemes, keywords, commands, or phrases is performed by the host device, the host is awaken after detection of voice activity at the microphone assembly. Failure of the host device to subsequently detect a more sophisticated voice characteristic will result in the host device returning to sleep or other low power mode and the microphone assembly returning to the low power voice activity detection mode.

Generally, upon awakening the host device, the microphone assembly also transmits any buffered data to the host device whereupon the host device may process the buffered data to avoid the loss of any information that was received at the microphone assembly during detection. In FIG. 5, after detection of one or more voice characteristics at the microphone assembly, buffered data and real-time data are communicated from the transducer assembly at substantially the same time, which means either at the same time or at virtually the same time or faster than the real-time rate at which data is received from the microphone sensor. In one embodiment, a multiplexor 560 multiplexes the buffered data with real-time data received before sending the multiplexed data to the host, whereupon the host device processes the multiplexed data so that the buffered data is stitched to and ordered before the real-time data, thereby providing a relatively continuous stream of information representative of that received by the microphone sensor. Only real-time data is communicated to the host device after the buffer is emptied or after there is sufficient overlap between the buffered data and the real-time data. The format of the buffered data may be changed before the buffered data is provided at the communication interface of the transducer assembly if a different data format is required. For example, where PCM format data is buffered and PDM format data is desired at the output of the communication interface, the PCM data may be converted to PDM format using an interpolator or other known mechanism.

In FIG. 4, in one implementation, the host device provides the external clock signal at the CLK contact of the interface 320 after the host device is awaken in response to an interrupt from the microphone assembly. For example, the microphone assembly may transmit the interrupt to the host via either the Select, Data other interface contact. The external clock signal provided to the microphone assembly may be at the same or substantially the same frequency as the internal clock signal and may be used to synchronize the internal clock signal with the clock signal of the host device. The external clock signal may also be at a different frequency than the internal clock signal. In one embodiment, the frequency of the external clock signal controls the operational state of the microphone assembly including the power consumption thereof. For example, a relatively high frequency external clock signal may transition the microphone assembly from a relatively low power operating mode to a higher power operating mode or a normal operating mode. An increase in the frequency of the external clock signal may occur upon detection or verification of voice activity in the data by the external processor.

According to one aspect of the disclosure, a unique identification code is assigned to a transducer assembly by uniquely hardwiring the one or more buses of the host processor, device or system to a particular set of contacts of the communication interface of the transducer assembly via an interconnecting carrier substrate. As suggested, the host processor is typically mounted on or otherwise coupled to external contacts on an interface of a carrier substrate comprising a printed circuit board. According to this aspect of the disclosure, conductive wires or traces disposed on or embedded in different carrier substrates are configured to connect the busses of the host device with different external contacts of the carrier substrate interface where the transducer assembly is mounted. The configuration of the conductive traces on the carrier substrate could be performed by the supplier or manufacturer of the carrier substrate. Thus configured, the external contacts on different carrier substrates are coupled to different busses of the host device or processor. The differently configured contacts of the carrier substrate may be used to assign different unique identities to transducer assemblies coupled to the carrier substrate. Some examples are discussed below.

The host communication interface busses are electrically connected to the external-device interface of the microphone assembly via the carrier substrate. However, the various host interface busses are coupled to different contacts of the microphone assembly depending on the configuration of the contacts on the carrier substrate. In the Soundwire example, the CLK bus is electrically connected to a specific one of the contacts P-1, P-2 and P-4 of the microphone assembly while the DATA bus is electrically connected to another one of the contacts P-1, P-2 and P-4 of the microphone assembly to set or program a unique identification code of the transducer assembly. For example, contact 1 of a first transducer coupled to a first carrier substrate may be connected to the DATA bus, and contact 2 of a second transducer coupled to a second carrier substrate may be connected to the DATA bus, resulting the assignment of different unique identification codes to the first and second transducers. Thus by configuring the contacts on multiple carrier substrates differently, as discussed, each microphone assembly may be assigned a unique identification code. Different sensor types and different communication protocols will necessarily implicate different busses configurations. The available number of unique identification codes depends on the number of available contacts and may also be limited by the particular protocol, since some protocols support only a limited number of devices on a common bus.

The transducer assembly is configured to determine its unique identification code by evaluating signals received on the external contacts of the interface. The transducer assembly may determine its assigned identification code by evaluating logic transitions on one or more of the interface contacts. In the Soundwire example above, logic state transitions on the DATA or CLK contacts are evaluated relative to one or more transition criterion (e.g., switching frequency, logic level, transition count, etc.) for this purpose. In other protocols, other logic transitions are evaluated relative to other criterion. Such information may or may not be known for a particular communication protocol. In some implementations, for example, it may only be necessary to determine that a signal on a particular contact is a clock signal rather than a select signal held high or low. This evaluation permits determination of the unique identity assigned to each of the one or more transducer assemblies. In Soundwire implementations, the unique identification code may be written to a predetermined address of a Slave Control Port (SCP) register of the SoundWire interface. In some embodiments, the transducer assembly communicates this identity to a host processor. In other embodiments, the host processor may already know the identity of the transducer assembly based on a known configuration of the carrier substrate.

Several ways of implementing this hard-wired setting or programming of the unique identification code of the transducer assembly are discussed with reference to FIG. 6, FIG. 7 and FIG. 8, which illustrate how unique identification codes may be assigned based on connectivity of two or more of the externally accessible contacts of the transducer assembly coupled to carrier substrates having different contact bus assignments. At least some of these examples are suitable for transducers implementing the Soundwire or PDM protocols and having the interface contact layout of FIG. 3, but the disclosure is applicable to transducer assemblies implementing other communication protocols and to transducer assemblies having different contact layouts.

Figure 6:
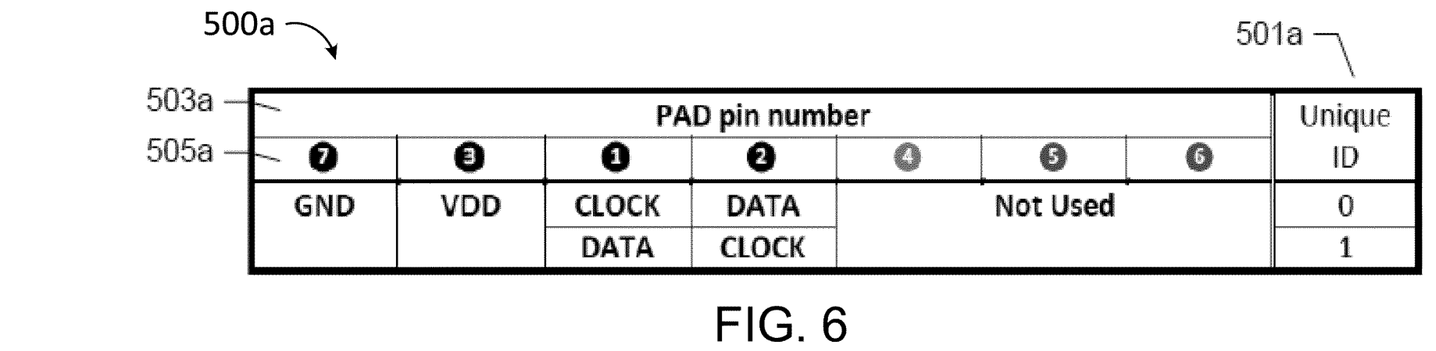
FIG. 6 is a first ID code table for deriving unique identification codes for a transducer assembly.

In FIG. 6, row 505a of ID code table 500a identifies the contact numbers of the microphone assembly with reference to the exemplary contact layout depicted on FIG. 3. As shown, pin P-3 is connected to a DC supply voltage (VDD) bus and pin P-7 is connected to a ground (GND) bus of the carrier substrate. In this example, pins P-4, P-5 and P-6 are unused. Pins P-1 and P-2 are used for the selection or programming of the unique identification code. When the DATA bus of the host communication interface is connected to pin P-1 and the CLK bus is connected to pin P-2, the unique identification code 1 is assigned as specified by column 501a. When the connectivity of these pins is reversed such that the DATA bus is connected to pin P-2 and the CLK bus is connected to pin P-1, the unique identification code 0 is assigned. The example allows assignment of a unique identification code to each of two microphone assemblies based on how the CLK and DATA busses of the host communication interface are connected to the contacts of the transducer assembly.

Figure 7:
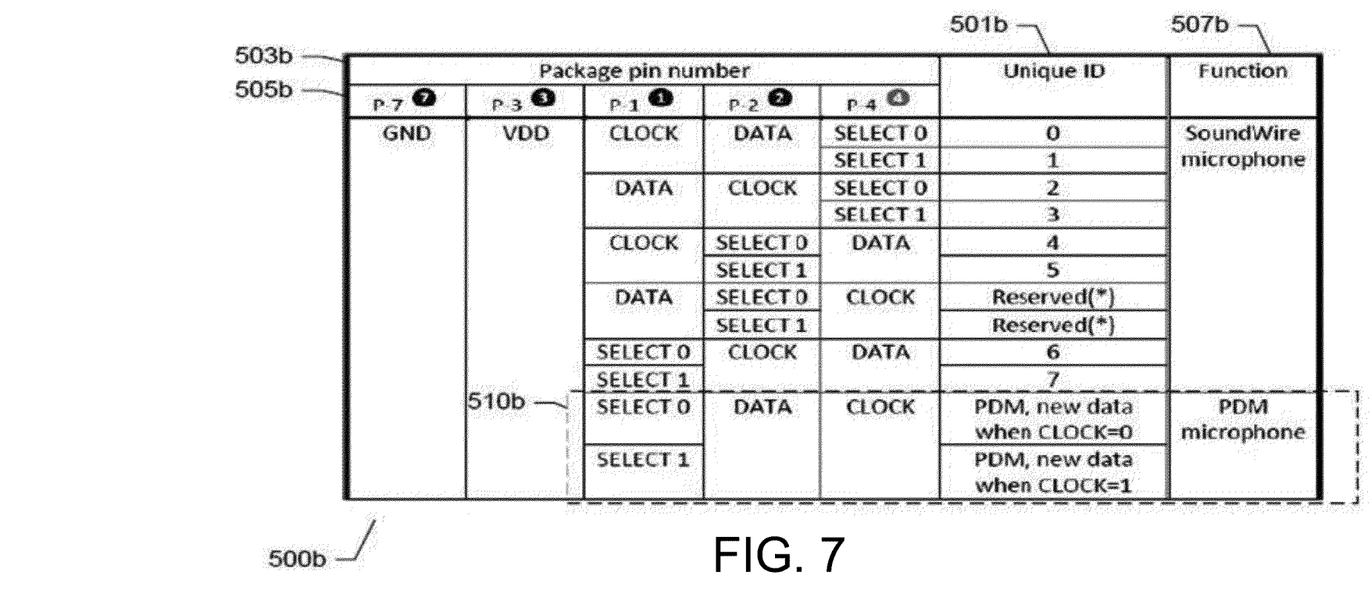
FIG. 7 is a second ID code table for deriving unique identification codes for a transducer assembly.

In FIG. 7, ID code table 500b supports up to eight unique identification code assignments, wherein pin P-3 is connected to the DC supply voltage (VDD) and pin P-7 is connected to ground GND of the carrier substrate as before. Pins P-5 and P-6 are unused in this example. Pins P-1, P-2 and P-4 are used for assignment or programming of the unique identification code of the microphone assembly. One of these pins is pulled logically high (Select 1) or logically low (Select 0) by the host processor, for example, by connecting the pin in question to a DC supply voltage (VDD) or to ground (GND) on the carrier substrate. The latter feature implies that the pin remains static or non-switched and that the processor of the transducer assembly may detect the static logic level of the pin in question (e.g., pin P-1, P-2 or P-4 in the present embodiment) by reading its state through a suitable I/O port of the processor. The first or uppermost row of the ID code table 500b concerning the connections of pins P-1, P-2 and P-4 shows that when the CLOCK bus of the host communication interface is connected to pin P-1, the DATA bus connected to pin P-2 and the pin P-4 connected logically low (0), the unique identification code 0 is assigned to the transducer assembly as specified by column 501b. Similarly, if the connections of pins P-1 and P-2 are maintained but the pin P-4 is connected logically high, "Select 1" instead of "Select 0", the unique identification code 1 is assigned and so forth for the various permutations of the connectivity of pins P-1, P-2 and P-4. Thus use of the additional Select contact permits the assignment of many more unique identities.

According to another aspect of the disclosure, the communication interface of the transducer assembly is configurable for different protocols depending on how the contacts of the carrier substrate are connected to the various busses of the host processor. In one example, the interface protocol is configured for the SoundWire protocol or for the PDM protocol. In FIG. 7, column 507b identifies the different protocols in this exemplary application. The PDM data interface is selected by connecting pins P-1, P-2 and P-4 to the host processor busses as specified by the two lower-most rows inside box 510*b*, wherein pin P-2 is connected to DATA and pin P-4 is connected to CLOCK. By connecting pin P-1 to either a logic high level ("Select 1") or a logic low level ("Select 0"), it is possible to select the phase, relative to the applied clock signal, where new data are transmitted on the DATA pin. The PDM data interface has been adopted by numerous prior art microphone assemblies such that providing a carrier substrate interface configured to accommodate the PDM protocol or some other protocol (e.g., Soundwire, I²C, I²S, USB, UART, SPI among others), the host processor interface is interoperable with numerous devices. The PDM data interface mode therefore provides convenient interoperability with legacy microphone products and enables testing and verification of numerous basic audio quality metrics of the microphone assembly without requiring advanced test equipment with a SoundWire compatible data communication interface or similar standardized data communication interfaces.

Figure 8:
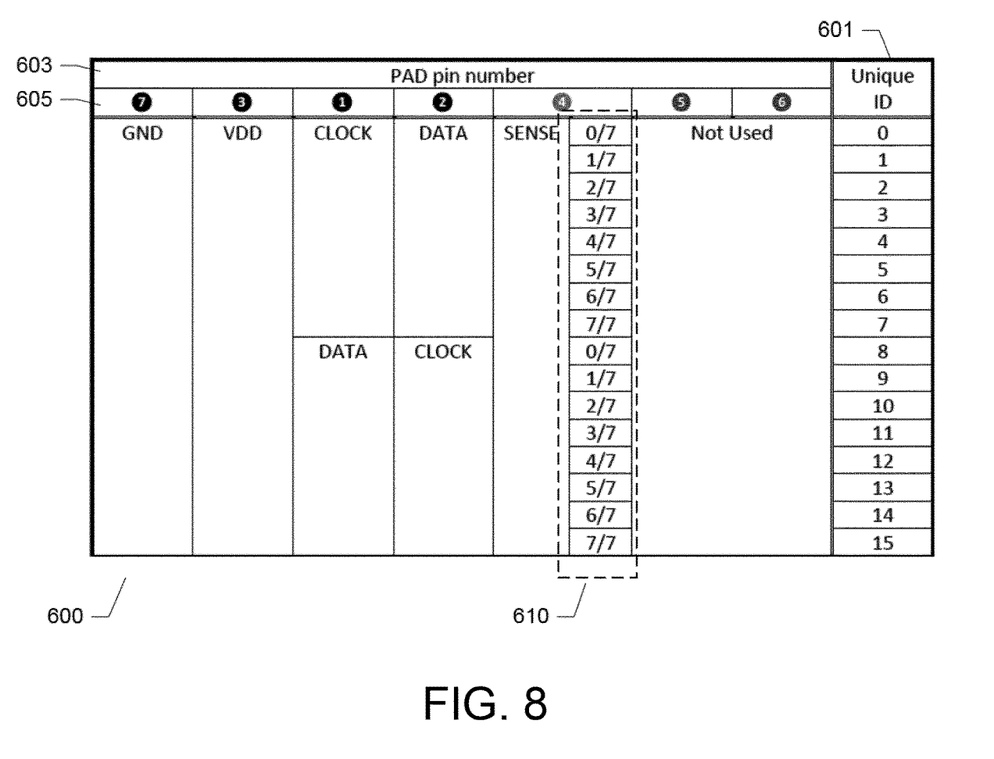
FIG. 8 is a third ID code table for deriving unique identification codes for a transducer assembly.

The ID code table 600 of FIG. 8 shows contact connectivity according to a third embodiment supporting up to fourteen unique identification codes for a 5 contact interface. As shown in table 600, the pin P-3 is connected to the DC supply voltage bus (VDD) and pin P-7 is connected to the ground (GND) bus of the carrier substrate as before. Pins P-5 and P-6 are unused. Pins P-1, P-2 and P-4 are used for the selection or programming of unique identification code. However, the functionality of the pin P-4 is different from that of pin P-4 in FIG. 7. In FIG. 8, the voltage on, or current through, pin P-4 can be detected by the processor of the transducer assembly at several discrete signal levels (seven discrete levels in FIG. 8) indicated in column 610 of ID table 600. The pin P-4 may be connected to a voltage/current sampling device (e.g., an A/D converter) of the processing circuit 122 (refer to FIG. 4) capable of measuring or detecting the voltage or current on P-4 with sufficient accuracy to distinguish the different levels. The voltage or current of pin P-4 may be set by connecting pin P-4 to a suitable DC voltage of the carrier substrate and may remain static or non-switched during operation. The transducer assembly processor may detect the voltage or current level of the pin P-4 by reading the voltage or current of a suitable I/O port of the processor connected to the voltage/current sampling device. The first or uppermost row of the ID code table 600 concerning the connections of pins P-1, P-2 and P-4 shows that when the CLOCK bus of the host communication interface is connected to pin P-1, the DATA bus connected to the pin P-2 and pin P-4 is connected to ground (0 volts), the unique identification code 0 is assigned as specified by column 601 so on for other voltages or currents (e.g., levels 1-7) detected on pin P-4. In other embodiments, the different signal levels, in combination with different configurations of the other contacts, may be used to communicate different protocols or a combination of different protocols and unique ID code assignments.

In one embodiment, a characteristic of one or more of the electrical signals received on corresponding contacts of the external-device interface are determined by evaluating one or more logic transitions of each of the one or more signals. In some instances, a result of the evaluation is that no logic transitions are detected, for example, where the electrical signal is a Select signal held high or low. In one implementation, the characteristic of at least two electrical signals at corresponding first and second contacts of the external-device interface are evaluated by determining which of the at least two electrical signals is a Clock signal and which of the at least two electrical signals has a high or low Select state. Such an evaluation may be used to determine the unique identity based on a contact on which the Clock signal is provided and based on a contact on which the electrical signal with the high or low Select state is provided, as illustrated in Table 7. If various signal levels are detectable, the unique ID may be determined based in part on the detected signal level, as discussed shown in FIG. 8.

Figure 9:
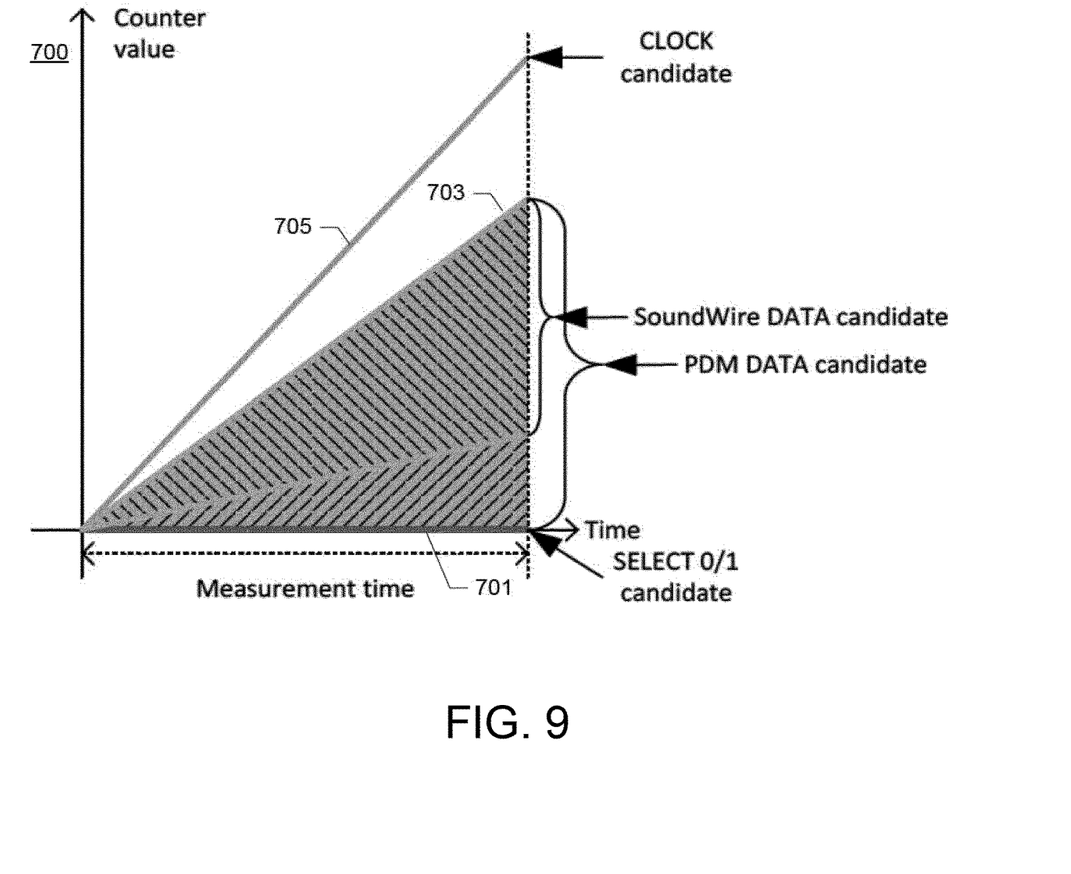
FIG. 9 is a plot of counter value versus measurement time signal activity on a communication interface.

FIG. 9 illustrates one mechanism by which the transducer assembly determines the characteristic of the one or more signals on corresponding contacts at the external-device interface of the transducer assembly. The x-axis represents measurement time on an arbitrary time scale and the y-axis represents a number of logic state transitions on the selected contact during the measurement time. The measurement time may be set to a fixed value by knowledge of the communication protocol in question. For Soundwire applications, the measurement time is set to a value between 0.2 ms and 1.0 ms such as about 0.333 ms for a 12.288 MHz frequency of the CLK signal on the CLK bus. This measurement time range is selected by noting that 4096 Bus Reset Bit-Slots correspond to ⅙ ms. This makes the measurement time and processor's ability to evaluate the logic transitions on the externally accessible contacts relative to a priori known SoundWire bus functionality immune to possible bus reset patterns on the SoundWire bus. The processor is configured to evaluate the logic transitions on the externally accessible contacts of the assembly electrically coupled to the busses of the host data communication interface based on counter data for each contact. More specifically, a rising-edge of a signal waveform on each contact is utilized to increment the count of a counter circuit or a counter function of the processor. At the end of the predetermined measurement time, a final count associated with each contact may be used to determine the corresponding functionality (e.g., Clock, Data, or Select) of each contact.

In FIG. 9, a counter is used to determine different types of logic transitions on contacts for a transducer assembly implementing the Soundwire protocol. A fixed logic level (e.g., Select 1 or Select 0) on an interface contact results in a count of 0 at the measurement time as shown on line 701. The CLOCK bus of the host communication interface is active after Power-On-Reset (POR) and carries a valid SoundWire clock frequency, which has a relatively high count value at the measurement time as shown on line 705. The DATA pin, taking into consideration the SoundWire NRZI DATA encoding of the DATA bus should, with high certainty, obtain a lower count compared to the count on the CLOCK bus. The DATA pin is expected to at least carry a SoundWire frame after POR. The counter fall-out range outcome is marked with the portion of the hatched triangle in graph 700.

For PDM mode, the CLOCK signal is expected to carry any valid PDM clock frequency according to a normal operating digital microphone with clock frequency measured in the MHz range. The DATA bus may or may not carry any PDM data. The DDR signalling on the DATA bus however has a theoretical toggle-rate that equals the CLOCK toggle-rate. Specifically, the SoundWire Bus Reset pattern may be a challenge in this measurement context. A SoundWire Bus Reset pattern consists of 4096 per Bit-Slot alternating HIGHs and LOWs.

In some embodiments, one or more electrical signals received at the external-device interface of the transducer assembly may require re-routing to different signal contacts of the communication protocol interface, for example, between the DATA and CLK contacts and the Soundwire interface 320 in FIG. 4. This re-routing may be performed by a switch that is controlled by a processor of the transducer assembly, for example by the processor 330 in FIG. 4.

Figure 10:
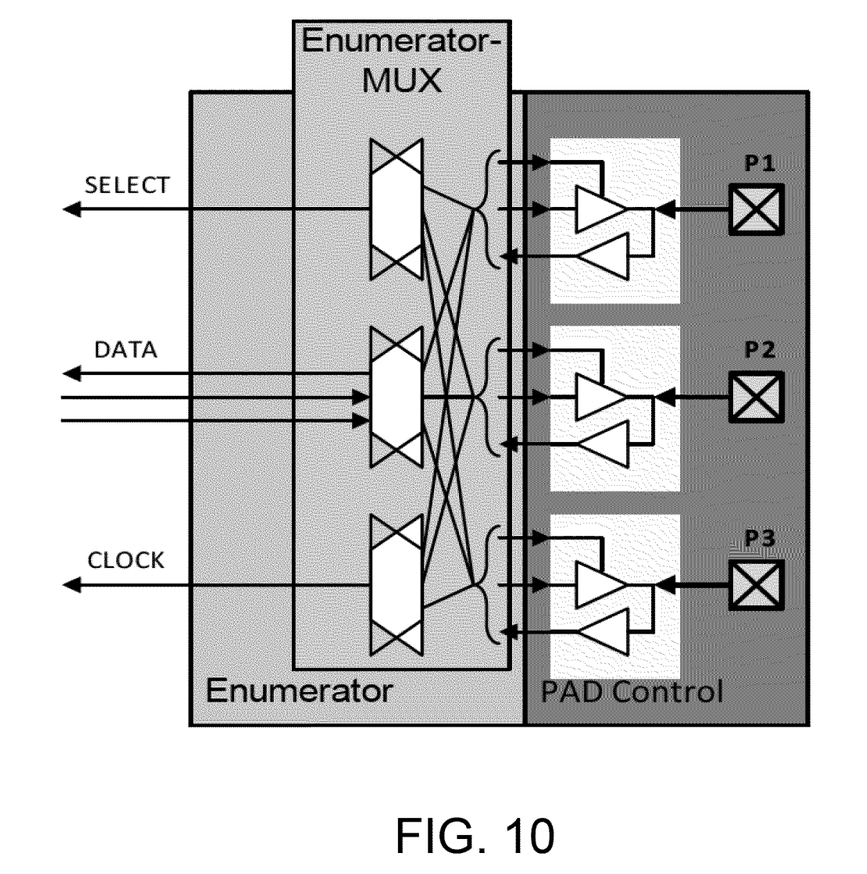
FIG. 10 is a schematic block diagram of a pin control and assignment mechanism for the plurality of externally accessible contacts of a transducer assembly.

FIG. 10 shows a schematic block diagram of a contact re-routing switch for the plurality of externally accessible contacts of the transducer assembly. P1, P2 and P3 represent external contacts on the external-device interface of a transducer assembly that utilizes Select, Data and Clock busses. The external contacts P1, P2 and P3 of the transducer assembly are electrically coupled to corresponding external contacts of a carrier substrate, which may have one of several different configurations as discussed. As indicated above, other contacts may also be used including power and ground. In the present example it is assumed only the Select, Data and Clock busses of the host device are wired to different external contacts of the carrier substrate to convey the unique ID or to convey the protocol configuration. In this example, any power and ground busses of the host device are not rewired to different external contacts of the carrier substrate for this purpose. More generally however other busses of the host device or system may be rewired to different external contacts of the carrier substrate to convey unique ID or protocol configuration information.

In some embodiments, the protocol interface of the transducer assembly, for example, the Soundwire interface 320 in FIG. 4, has a hardwired internal bus interface. In FIG. 10, for example, the internal Select, Data and Clock bus contacts of the protocol interface (not shown) are hardwired and aligned with corresponding outputs 1002, 1004 and 1006, respectively, of a re-routing circuit 1010. Thus where the external interface contacts of the carrier substrate are rewired to different busses of the host device or system (to provide unique IDs or protocol configuration information), it may be necessary for the transducer assembly to re-route one or more signals between the external interface of the transducer assembly and the hard-wired internal contacts of the protocol interface. For example, with reference to FIG. 10 the carrier substrate may be wired to provide CLOCK and DATA on external contacts P1 and P2, respectively, on the interface of the transducer assembly interface. Thus it may be necessary to re-route the CLOCK signal on the external contact P1 so that it aligns with internal bus contact 1006 of the protocol interface of the transducer assembly. In this example, DATA on contact P2 is already aligned with the corresponding DATA contact of the protocol interface and does not require re-routing.

In FIG. 10, the re-routing of the signals on the external contacts of the transducer assembly occurs after determination of the signal types and in some embodiments the signal levels on the various external contacts as discussed above. For this purpose the microphone assembly includes a re-routing circuit 1010 configured to re-route signals on the external-interface contacts to the hardwired internal bus interface.

According to another aspect of the disclosure, the transducer assembly and more generally any electronic device having an external-device interface is configurable to comply with one or more different communication protocols implemented by an external device (e.g., a host device), several non-limiting examples of which are discussed herein. In one embodiment, the electronic device detects the protocol of the host device interface based on signals received from the host interface and then the electronic device is automatically configured to communicate using the detected protocol. In another embodiment, the electronic device receives a message that identifies the protocol and the electronic device is configured accordingly for communication using the identified protocol. Various approaches are described below for determining the communication protocol used by the external device to which the electronic device is coupled.

In one embodiment, the electronic device is a transducer assembly comprising among other components a sensor, one or more electrical circuits, and an external-device communication interface having a plurality of contacts. FIGS. 4 and 5 are representative of such circuits, although not all implementations will include all of the circuits shown and other implementations will include circuits not shown. A transducer assembly may be embodied as a microphone assembly or as an assembly with a sensor other than a microphone. More generally, the electronic device may be any device that includes a communication protocol interface for communicating with some other device like a host device or system that communicates with the electronic device using a communication protocol.

Figure 11:
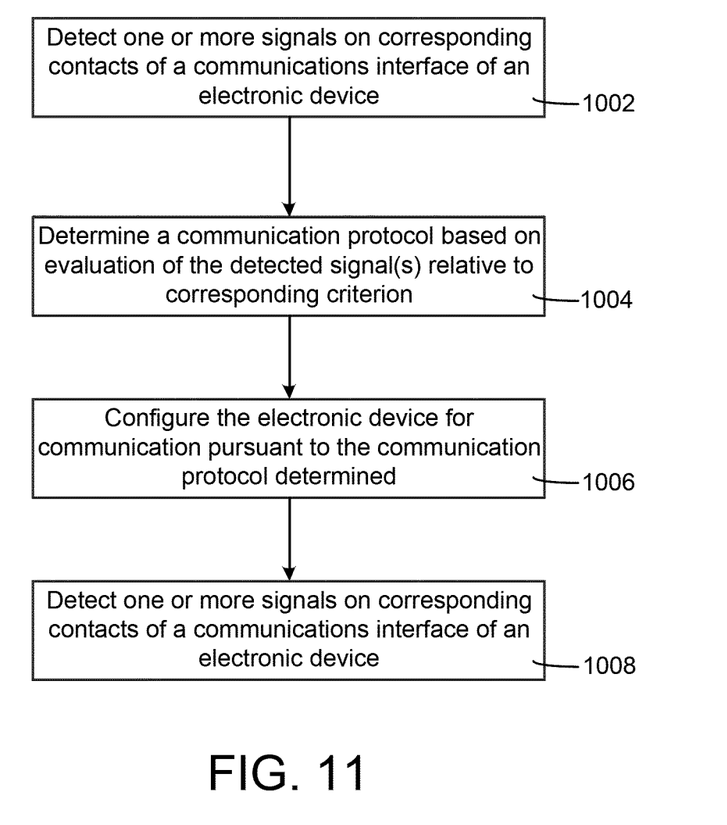
FIG. 11 is a flow diagram for determining a communication protocol on a communication interface.

FIG. 11 shows a flow chart of a process for determining a communication protocol on a communication interface. At step 1002, the electronic device detects one or more signals on corresponding contacts of the communication interface when the contacts on which the detected signals are electrically connected to external contacts of an external system or host device providing the signals, for example, via a carrier substrate associated with a host device or system. At step 1004, the electronic device determines a communication protocol used by the external device based on an evaluation of the one or more detected signals, examples of which are discussed below. The evaluation may be performed by circuits of the electronic device, for example, the processing circuit 122 in FIG. 4.

Generally, communication protocols have a specified set of signals (e.g., Clock, Data, Select, etc.) with detectable characteristics, one or more of which may be used alone or in combination to identify the protocol. Thus signal characteristics are detected for one or more signals at corresponding contacts of the external-device interface. Such characteristics may be obtained detecting logic transitions. Repeating logic transitions may be indicative of a clock signal generally or of a clock signal frequency in particular. Some detectable logic transitions may be indicative of start-stop bit intervals, or other periodic or repeating signal structures. Other detectable logic transitions may be indicative of rates of change, or non-periodic or non-repetitive signal patterns. As suggested, detectable logic transitions also include a lack of transitions. The absence of logic transitions on a signal could indicate that the signal is selected (e.g., held) high or low. Signal characteristics also include data patterns. These and other signals or data patterns, or lack thereof, detected on one or more external-device interface contacts may be used to identify the communication protocol. Select examples of the use of these and other signal characteristics to identify communication protocols are discussed further herein.

As suggested, the communication protocol may be identified generally using one or more signal characteristics. Generally, the robustness of communication protocol identification will be greater when more characteristics are used to identify the protocol. Thus characteristics of multiple signals may be required to accurately identify a particular protocol. In some embodiments, a combination or aggregation of signal characteristics unique to a particular communication protocol may define a protocol signature used to identify the protocol. To identify a communication protocol, a set of one or more signal characteristics or the protocol signature may be compared to different sets of reference information wherein each set of reference information is mapped to a different protocol. A particular protocol is identified by matching the one or more signal characteristics to reference information that is associated with a particular protocol. The reference information may be stored in memory on the electronic device. In other embodiments, the specific set of contacts on which a particular signal or set of signals is received or detected may also be used to identify the protocol. In this latter case, the reference information maps the particular signal and the set of one or more contacts to the particular protocol.

The Inter-Integrated Circuit (I²C) protocol is a multi-master, multi-slave serial bus for connecting peripheral devices to a processor or controller. In the I²C protocol, transitions detected on a serial clock (SCK) bus may be used to identify the protocol. The clock signal is characterized by a series of pulse trains for each information transfer, wherein the pulse repetition rate is at a frequency of 100 KHz, 400 KHz, or 1 MHz. The data pattern of the I²C protocol may also be used, alone or in combination with the clock signal, to identify the protocol. The I²C data pattern is characterized by levels on a serial data (SDA) bus as sampled by the SCK, wherein the data pattern comprises a packet containing a slave ID followed by an address, a Read/Write bit, and data. Any particular slave device responds only to packets containing its slave ID, so the slave ID part of each packet is an unchanging and predictable pattern. The signature may also include an explicit data message sent to an I²C slave during auto-detection. This message would be specified by the manufacturer.

The Integrated Interchip Sound (I²S) protocol is a serial bus for, among other uses, connecting digital audio devices. In I²S the protocol, repeating patterns detected on one or both of a bit clock (BCLK) bus and a Word Sync (WS) bus may be used to identify the protocol. The WS signal repeats at one of a known set of frequencies like 8 KHz, 16 KHz, 24 KHz, 32 KHz, 44.1 KHz, 48 KHz, 88.2 KHz, 96 KHz, or 196 KHz. The BCLK signal repeats at a rate of 2×16, 2×24, or 2×32 that of the WS signal. A data pattern on a Serial Data In (SDI) bus does not normally have a fixed value. However, any known and identifiable information on the SDI bus may be used to detect the protocol.

The universal asynchronous receiver/transmitter (UART) protocol translates data characters to an asynchronous serial stream format that encapsulates data between start and stop bits. In the UART protocol, a start-stop bit interval may be used to identify the communication protocol. A data pattern on a Serial Data In (SDI) bus may also be used alone or in combination with start-stop bit interval to identify the protocol. The SDI bus is at a high level when idle. The SDI bus is driven low for at least one bit time, 8 bits of information are sent, and then the SDI bus is driven high again for one or two stop bit times. A data pattern for the information bits is not fixed for the UART protocol. The UART protocol interface also includes a parity bit, which may be used to help identify the protocol.

The Serial Peripheral Interface (SPI) bus protocol is a synchronous communication interface. In the SPI protocol, signals on a serial clock (SCLK) bus and a chip enable (CEN) bus may be sued to identify the protocol. In between SPI frames, the CEN signal is high. When a frame begins, the CEN signal is driven low for a multiple of 16 SCLK cycles. The exact number of SCLK cycles per CEN frame is not fixed for the generic SPI protocol, but is defined for any particular system. A data pattern for information bits on the input (MOSI) is not fixed for the SPI protocol. In some instances, the communication protocol may be identified using known information on MOSI.

In FIG. 11, at step 1006, the electronic device is configured to communicate pursuant to the identified communication protocol. In some implementations, configuration of the electronic device occurs before the electronic device transmits any information to the host device. In other embodiments, the electronic device transmits some information to the external device before or during configuration of the interface of the electronic device, or even before receiving any information from the external device. In some embodiments, for example, the electronic device may transmit control or other information, but not data, to the host device before configuration of the communication interface, whereupon data is transmitted only after configuration of the interface for the detected protocol. In FIG. 11, at step 1008, the electronic device communicates from the communication interface using the configured protocol. In one embodiment, the electronic device automatically detects the communication protocol of an external device to which the electronic device is connected and configures the electronic device including the communication protocol interface thereof, to communicate pursuant to the detected protocol.

While the present disclosure and what is presently considered to be the best mode thereof has been described in a manner that establishes possession by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the disclosure, which is to be limited not by the exemplary embodiments but by the appended claims.

The invention claimed is:

1. An electronic device comprising:
   an external-device interface having a plurality of electrical contacts; and
   an integrated circuit having a processor and a communication protocol interface having a plurality of contacts, each of the plurality of contacts of the communication protocol interface coupled to a corresponding electrical contact of the external-device interface, the processor configured to:
      determine a characteristic of one or more signals provided on at least a subset of the plurality of electrical contacts of the external-device interface when the subset of the plurality of electrical contacts are connected to interface contacts of an external device;
      determine a communication protocol based on the characteristic of the one or more signals; and
      configure the communication protocol interface for communication using the communication protocol;
   wherein the electronic device supports communication using the communication protocol after the communication protocol interface is configured.

2. The device of claim 1, wherein the processor is configured to:
   determine the characteristic of the one or more signals by detecting a logic transition of at least one signal on an electrical contact of the external-device interface; and
   determine the communication protocol by comparing the characteristic of the one or more signals to reference information.

3. The device of claim 2, wherein the logic transition represents any one of a repeating pattern, a repetition rate, or a data pattern.

4. The device of claim 1, wherein the characteristic of one signal is a pulse repetition on a serial clock contact of the external-device interface and the characteristic of another signal is a data pattern on data contact of the external-device interface.

5. The device of claim 1, wherein the characteristic of one signal is pulse repetition on a bit clock contact of the external-device interface and the characteristic of another signal is a pattern on word sync contact of the external-device interface.

6. The device of claim 1, wherein the characteristic of one signal is start-stop interval on a serial data contact of the external-device interface.

7. The device of claim 1, wherein the characteristic of one signal is an input on a serial clock contact of the external-device interface and the characteristic of another signal is an input on a chip-enable contact of the external-device interface.

8. The device of claim 1, wherein the device is a microphone assembly comprising an acoustic sensor having an electrical signal output coupled to the integrated circuit, and wherein:
the integrated circuit comprises a buffer and a voice activity detector;
the processor is configured to buffer data representative of sound received by the acoustic sensor in the buffer while the voice activity detector determines whether voice activity is present in data representative of sound received by the acoustic sensor; and
the processor is configured to communicate data from the buffer and real-time data representative of sound received by the acoustic sensor upon determining the presence of voice activity.

9. An integrated circuit for an electronic device having an external-device interface with electrical contacts, the integrated circuit comprising:
a processor; and
a communication protocol interface having a plurality of contacts connectable to corresponding electrical contacts of an external-device interface;
wherein the processor is configured to:
determine a characteristic of one or more signals received on at least a subset of the plurality of contacts;
determine a communication protocol based on the characteristic of the one or more signals received; and
configure the communication protocol interface for communicating using the communication protocol; and
wherein the integrated circuit supports communication using the communication protocol after the communication protocol interface is configured.

10. The integrated circuit of claim 9, wherein the processor is configured to:
determine the characteristic of the one or more signals by detecting a logic transition of at least one signal; and
determine the communication protocol by comparing the characteristic of the one or more signals to reference information.

11. The integrated circuit of claim 10, wherein the logic transition represents any one of a repeating pattern, a repetition rate, or a data pattern.

12. The integrated circuit of claim 9, wherein the characteristic of one signal is a pulse repetition on a serial clock contact and the characteristic of another signal is a data pattern on data contact.

13. The integrated circuit of claim 9, wherein the characteristic of one signal is pulse repetition on a bit clock contact and the characteristic of another signal is a pattern on word sync contact.

14. The integrated circuit of claim 9, wherein the characteristic of one signal is start-stop interval on a serial data contact.

15. The integrated circuit of claim 9, wherein the characteristic of one signal is an input on a serial clock contact and the characteristic of another signal is an input on a chip-enable contact.

16. A method in an electronic device comprising a processor and a communication protocol interface coupled to electrical contacts of an external-device interface, the method comprising:
receiving one or more signals on corresponding electrical contacts of the external-device interface;
determining a communication protocol based on a characteristic of the one or more signals;
configuring the communication protocol interface for communication using the communication protocol; and
communicating via the external-device interface using the communication protocol after the communication protocol interface is configured.

17. The method of claim 16, further comprising:
determining the characteristic of the one or more signals by detecting a logic transition of at least one signal on a contact of the external-device interface, the logic transition representing at least one of a repeating pattern, a repetition rate, or a data pattern;
wherein determining the communication protocol comprises comparing the characteristic of the one or more signals to reference information.

18. The method of claim 16, determining the characteristic of the one or more signals by detecting a pulse repetition on a serial clock contact and a data pattern on data contact of the external-device interface.

19. The method of claim 16, determining the characteristic of the one or more signals by detecting a pulse repetition on a bit clock contact and a signal pattern on a word sync contact of the external-device interface.

20. The method of claim 16, determining the characteristic of the one or more signals by detecting a start-stop interval on a serial data contact of the external-device interface.

21. The method of claim 16, determining the characteristic of the one or more signals by detecting an input signal on a serial clock contact and an input signal on a chip-enable contact of the external-device interface.

* * * * *